US012756607B2

(12) United States Patent
Zhao et al.

(10) Patent No.: US 12,756,607 B2
(45) Date of Patent: Oct. 6, 2026

(54) WIRELESS COMMUNICATION METHOD AND COMMUNICATIONS DEVICE

(71) Applicant: QUECTEL WIRELESS SOLUTIONS CO., LTD., Shanghai (CN)

(72) Inventors: Zheng Zhao, Shanghai (CN); Ling Lyu, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/400,589

(22) Filed: Nov. 25, 2025

(65) Prior Publication Data

US 2026/0081817 A1 Mar. 19, 2026

Related U.S. Application Data

(63) Continuation of application No. PCT/CN2024/077347, filed on Feb. 18, 2024.

(51) Int. Cl.
*H04L 27/26* (2006.01)
*H04L 5/00* (2006.01)

(52) U.S. Cl.
CPC .......... *H04L 27/261* (2013.01); *H04L 5/0044* (2013.01)

(58) Field of Classification Search
CPC ... H04L 27/261; H04L 5/0044; H04L 5/0051; H04L 5/0082; H04L 25/0224; H04L 5/0078
See application file for complete search history.

(56) References Cited

U.S. PATENT DOCUMENTS

| | | | | |
|---|---|---|---|---|
| 2021/0359882 A1* | 11/2021 | Liu | ........................ | H04L 5/0051 |
| 2022/0330291 A1* | 10/2022 | Choi | ................. | H04W 56/0015 |
| 2023/0025902 A1* | 1/2023 | Xu | ........................ | H04W 72/51 |
| 2023/0246765 A1* | 8/2023 | Rico Alvarino | ...... | H04L 5/0048 370/330 |
| 2023/0344594 A1* | 10/2023 | Lee | ........................ | H04L 5/0051 |
| 2024/0089895 A1* | 3/2024 | Si | .......................... | H04W 68/02 |
| 2025/0047451 A1* | 2/2025 | Xiong | ................... | H04L 5/0051 |
| 2026/0095358 A1* | 4/2026 | Wang | .................... | H04L 5/0051 |

FOREIGN PATENT DOCUMENTS

CN 114727221 A 7/2022

OTHER PUBLICATIONS

Chao Yang, Shiwen Mao and Xuyu Wang, "An Overview of 3GPP Positioning Standards", Mar. 2022 | vol. 26, Issue 1, GetMobile (Year: 2022).*
International Search Report in International Appln. No. PCT/CN2024/077347, mailed on Jul. 10, 2024, 5 pages (with English translation).

* cited by examiner

*Primary Examiner* — Aristocratis Fotakis
(74) *Attorney, Agent, or Firm* — Fish & Richardson P.C.

(57) ABSTRACT

Disclosed are a wireless communication method and a communications device. One example method includes: determining, by a terminal device based on first information, whether to send a first sounding reference signal (SRS) for positioning the terminal device, and the first information comprises one or more of following: a first time window, a resource configuration of the first SRS, or a resource configuration of a first signal or channel.

20 Claims, 4 Drawing Sheets

WIRELESS COMMUNICATION METHOD AND COMMUNICATIONS DEVICE

CROSS-REFERENCE TO RELATED APPLICATIONS

This application is a continuation of International Application No. PCT/CN2024/077347, filed on Feb. 18, 2024, the disclosure of which is hereby incorporated by reference in its entirety.

TECHNICAL FIELD

The present application relates to the field of communications technologies, and more specifically, to a wireless communication method and a communications device.

BACKGROUND

Currently, a terminal device may implement positioning by sending a sounding reference signal (SRS). However, there is currently no appropriate solution yet for how the terminal device sends the SRS.

SUMMARY

The present application provides a wireless communication method and a communications device. The following describes several aspects of embodiments of the present application.

According to a first aspect, a wireless communication method is provided, including: determining, by a terminal device based on first information, whether to send a first sounding reference signal SRS, where the first SRS is used to position the terminal device, and the first information includes one or more of the following: a first time window, a resource configuration of the first SRS, or a resource configuration of a first signal or channel.

According to a second aspect, a wireless communication method is provided, including: sending, by a network device, second information to a terminal device, where the second information is used to indicate a first time window, and the first time window is used by the terminal device to determine whether to send a first SRS.

According to a third aspect, a terminal device is provided, including: a determining unit, determining, based on a first time window, whether to send a first sounding reference signal SRS, where the first SRS is used to position the terminal device.

According to a fourth aspect, a network device is provided, including: a sending unit, sending second information to a terminal device, where the second information is used to indicate a first time window, and the first time window is used by the terminal device to determine whether to send a first SRS.

According to a fifth aspect, a terminal device is provided, including a memory, a processor, and a transceiver, where the memory is configured to store one or more computer programs, and the processor is configured to invoke the computer program in the memory, to cause the terminal device to perform the method according to the first aspect.

According to a sixth aspect, a network device is provided, including a memory, a processor, and a transceiver, where the memory is configured to store one or more computer programs, and the processor is configured to invoke the computer program in the memory, to cause the network device to perform the method according to the second aspect.

According to a seventh aspect, an apparatus is provided, including a processor configured to invoke a program from a memory to perform the method according to the first aspect or the second aspect.

According to an eighth aspect, a chip is provided, including a processor configured to invoke a program from a memory, to cause a device installed with the chip to perform the method according to the first aspect or the second aspect.

According to a ninth aspect, a computer-readable storage medium is provided, storing a program, where the program causes a computer to perform the method according to the first aspect or the second aspect.

According to a tenth aspect, a computer program product is provided, including a program, where the program causes a computer to perform the method according to the first aspect or the second aspect.

According to an eleventh aspect, a computer program is provided, where the computer program causes a computer to perform the method according to the first aspect or the second aspect.

Based on the foregoing technical solutions, a terminal device may determine, based on a first time window, a resource configuration of a first SRS, and a resource configuration of a first signal or channel, whether to send the first SRS, so as to provide a clear solution for sending of the first SRS.

DETAILED DESCRIPTION OF THE EMBODIMENTS

The following describes technical solutions in the present application with reference to accompanying drawings.

Architecture of a Communications System

Figure 1:
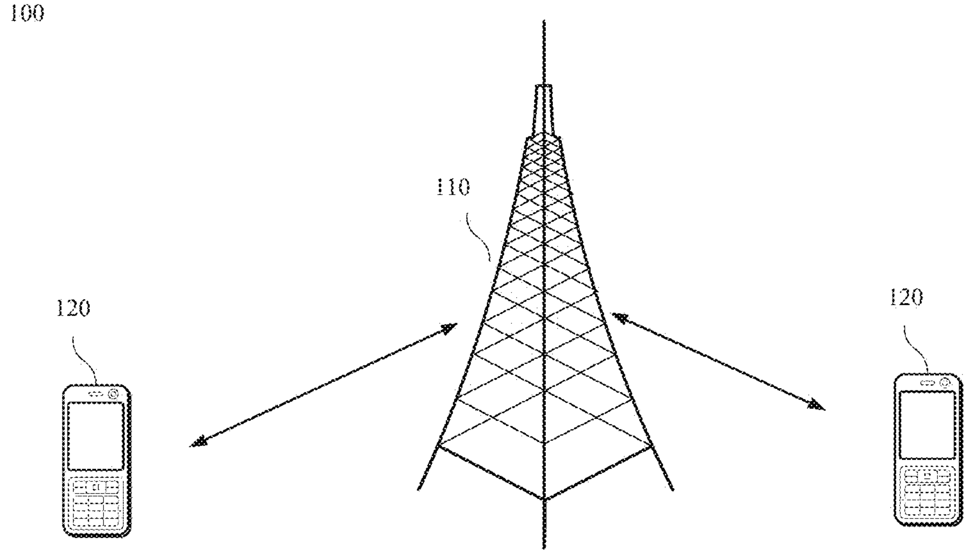
FIG. 1 shows a wireless communications system 100 to which an embodiment of the present application is applied.

FIG. 1 shows a wireless communications system 100 to which an embodiment of the present application is applied. The wireless communications system 100 may include a network device 110 and terminal devices 120. The network device 110 may be a device that communicates with the terminal device 120. The network device 110 may provide communication coverage for a specific geographic area, and may communicate with the terminal device 120 located within the coverage.

FIG. 1 exemplarily shows one network device and two terminal devices. Optionally, the wireless communications system 100 may include a plurality of network devices, and another quantity of terminal devices may be included within coverage of each network device, which is not limited in embodiments of the present application.

Optionally, the wireless communications system 100 may further include other network entities, such as a network controller and a mobility management entity, which is not limited in embodiments of the present application.

It should be understood that technical solutions of embodiments of the present application may be applied to various communications systems, such as a 5th generation (5th generation, 5G) system or a new radio (new radio, NR) system, a long term evolution (long term evolution, LTE) system, an LTE frequency division duplex (frequency division duplex, FDD) system, and an LTE time division duplex (time division duplex, TDD) system. The technical solutions provided in the present application may further be applied to future communications systems, such as a 6th generation mobile communications system and a satellite communications system.

The terminal device in embodiments of the present application may also be referred to as user equipment (user equipment, UE), an access terminal, a subscriber unit, a subscriber station, a mobile site, a mobile station (mobile station, MS), a mobile terminal (mobile terminal, MT), a remote station, a remote terminal, a mobile device, a user terminal, a terminal, a wireless communications device, a user agent, or a user apparatus. The terminal device in embodiments of the present application may be a device providing a user with voice and/or data connectivity and capable of connecting people, objects, and machines. For example, the terminal device is a handheld device, a vehicle-mounted device, or the like having a wireless connection function. The terminal device in embodiments of the present application may be a mobile phone (mobile phone), a tablet computer (Pad), a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), or the like. Optionally, the UE may be used to act as a base station. For example, the UE may act as a scheduling entity that provides a sidelink signal between UEs in V2X or D2D, or the like. For example, a cellular phone and a vehicle communicate with each other by using a sidelink signal. A cellular phone and a smart home device communicate with each other without relaying of a communication signal by a base station.

The network device in embodiments of the present application may be a device for communicating with the terminal device. The network device may also be referred to as an access network device or a wireless access network device. For example, the network device may be a base station. The network device in embodiments of the present application may be a radio access network (radio access network, RAN) node (or device) that connects the terminal device to a wireless network. The base station may broadly cover various names in the following, or may be interchangeable with the following names, for example: a NodeB (NodeB), an evolved NodeB (evolved NodeB, eNB), a next generation NodeB (next generation NodeB, gNB), a relay station, a transmitting and receiving point (transmitting and receiving point, TRP), a transmitting point (transmitting point, TP), a master eNode MeNB, a secondary eNode SeNB, a multi-standard radio (MSR) node, a home base station, a network controller, an access node, a wireless node, an access point (access point, AP), a transmission node, a transceiver node, a base band unit (base band unit, BBU), a remote radio unit (Remote Radio Unit, RRU), an active antenna unit (active antenna unit, AAU), a remote radio head (remote radio head, RRH), a central unit (central unit, CU), a distributed unit (distributed unit, DU), and a positioning node. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in device-to-device D2D, vehicle-to-everything (vehicle-to-everything, V2X), and machine-to-machine (machine-to-machine, M2M) communications, a network-side device in a 6G network, a device that functions as a base station in a future communications system, or the like. The base station may support networks with a same access technology or different access technologies. A specific technology and a specific device used by the network device are not limited in embodiments of the present application.

The base station may be fixed or mobile. For example, a helicopter or an unmanned aerial vehicle may be configured to act as a mobile base station, and one or more cells may move depending on a location of the mobile base station. In other examples, a helicopter or an unmanned aerial vehicle may be configured to serve as a device in communication with another base station.

In some deployments, the network device in embodiments of the present application may be a CU or a DU, or the network device includes a CU and a DU. The gNB may further include an AAU.

The network device and the terminal device may be deployed on land, including being indoors or outdoors, handheld, or vehicle-mounted, may be deployed on a water surface, or may be deployed on a plane, a balloon, or a satellite in the air. A scenario in which the network device and the terminal device are located is not limited in embodiments of the present application.

It should be understood that all or some of functions of the communications device in the present application may also be implemented by software functions running on hardware, or by virtualization functions instantiated on a platform (for example, a cloud platform).

Reduced-Capability (Reduce Capability, RedCap) Terminal Device

In some communications systems (for example, a 5G system), communication scenarios with large bandwidths and low latency are studied, and mainly include the following scenarios: an enhanced mobile broadband (enhanced mobile broadband, eMBB) scenario, a massive machine type communication (massive machine type communication, mMTC) scenario, an ultra-reliable and low latency communications (ultra-reliable and low latency communications, URLLC) scenario, and a time sensitive communication (time sensitive communication, TSC) scenario.

In an early stage of development of a communication technology, design of a chip and a terminal is extremely complex, investment in research and development is extremely high, and terminal costs are also unacceptable in many application scenarios of actual deployment.

For many application scenarios, rate requirements, performance requirements, power consumption requirements, and cost requirements are moderate. Under these requirements, RedCap came into being. A RedCap terminal device is used in scenarios with relatively low performance requirements. For example, the scenarios include but are not limited to the following three scenarios:

Scenario 1: industrial wireless sensors. An industrial wireless sensor has lower requirements on latency and reliability than a URLLC terminal, and has lower device costs and power consumption than a URLLC terminal and an eMBB terminal.

Scenario 2: video surveillance, which may be used in scenarios such as a smart city and an industrial process. In a smart city scenario, a device is mainly used for data collection and processing, so as to monitor and control urban resources more effectively, thereby providing more effective services for urban residents.

Scenario 3: wearable devices. For example, the wearable devices include but are not limited to a smartwatch, a ring, an electronic health device, and a medical monitoring device. Generally, these devices are relatively small.

The foregoing scenarios may have the following common requirements:

1. Device costs: These devices have lower costs and lower requirements for complexity than eMBB terminals of versions 15/16 (R15/16).

2. Device size: Device sizes of these devices are required to be relatively small.

3. Coverage: Coverage of these devices is required to be equivalent to or similar to that of eMBB terminals of versions 15/16. In this case, compensation is required if reducing receiving antennas, a bandwidth, a power level, or the like to lower complexity of a terminal device results in coverage loss.

The foregoing three scenarios may have some other different requirements. Performance requirements of these scenarios are as follows:

For scenario 1, reliability is required to be 99.99%; end-to-end latency is required to be 100 ms; a bit rate is required to be 2 Mbps; a device is required to be stationary; and a battery life is required to be several years. Optionally, for a safety-related sensor, latency may be required to range from 5 ms to 10 ms.

For scenario 2, a bit rate is required to range from 2 Mbps to 4 Mbps; latency is required to be less than 500 ms; and reliability is required to range from 99% to 99.9%. An uplink traffic volume is relatively large. For a high-end video, a rate is required to range from 2 Mbps to 4 Mbps.

For scenario 3, refer to requirements of access category 4 in an LTE system, where a rate requirement is 150 Mbps/50 Mbps.

SRS-Based Positioning

An uplink sounding reference signal (sounding reference signal, SRS) is used for uplink positioning and uplink and downlink positioning. A terminal device sends an SRS to a network device. The network device positions the terminal device by measuring relevant parameters of the SRS.

The relevant parameters of the SRS may include, for example, an observed time difference of arrival (observed time difference of arrival, OTDOA) or an angle of arrival (angle of arrival, AOA).

For example, an SRS-based positioning technology may include an uplink time difference of arrival (uplink time difference of arrival, UL-TDOA) and an uplink angle of arrival (uplink angle of arrival, UL-AOA).

An UL-TDOA-based positioning principle is to measure time differences of arrival of an SRS received by different network devices, and determine location information of a terminal device based on the time differences of arrival.

An UL-AOA-based positioning principle is to measure an uplink angle of arrival of an SRS received by a network device, and determine location information of a terminal device based on the uplink angle of arrival, where the uplink angle of arrival may be an included angle between the SRS sent by the terminal device and a specific direction (for example, a horizontal plane or a normal to a horizontal plane) when the SRS arrives at the network device. For example, the uplink angle of arrival of the SRS sent by the terminal device may be an included angle $\alpha$ between the SRS sent by the terminal device and a due north direction when the SRS arrives at the network device.

In addition, an SRS-based positioning technology may further include other positioning technologies, for example, a positioning technology based on a multi-cell round trip time (multi-cell round trip time, Multi-RTT) or a positioning technology based on an enhanced cell identity (enhanced cell identity, E-CID).

Innovation in the Internet of Things is inseparable from support of a location service. Especially, in scenarios of anti-lost tracking for the elderly and children, parking space guiding in a parking lot, recording of a working track of a robot in a factory, recording of a cargo flow track, or the like, a relatively high requirement is put forward for positioning precision.

During positioning, a wider bandwidth occupied by a reference signal used for positioning leads to higher positioning precision. Therefore, for an SRS-based positioning manner, a terminal device is required to be capable of sending an SRS that occupies a relatively wide bandwidth, so as to ensure specific positioning precision.

A reduced-capability terminal device has a relatively low performance requirement and a limited bandwidth processing capability. During positioning, a positioning pilot bandwidth may be increased by sending and receiving an SRS in a frequency hopping manner, thereby improving positioning precision.

A frequency hopping technology is one of the most commonly used spread spectrum manners in wireless communications. The frequency hopping technology is a communication manner in which a carrier frequency for receiving and sending wireless transmission signals of devices on both sides is discretely changed according to a predetermined algorithm or rule. In other words, a carrier frequency used in wireless communication randomly hops under the control of a pseudo-random change code.

From the perspective of implementation of a communication technology, a frequency hopping technology is a communication manner of performing multi-frequency frequency shift keying based on a code sequence, and is also a communications system based on code-controlled carrier frequency hopping. From the perspective of time domain, a frequency hopping signal is a multi-frequency frequency shift keying signal. From the perspective of frequency domain, a spectrum of a frequency hopping signal randomly hops at unequal intervals on a very wide frequency band. Frequency hopping serves as digital spread spectrum communication. In this communication manner, a transmission bandwidth of a signal is several times an original bandwidth of the signal.

When a terminal device performs positioning by sending an SRS, there is no clear solution for how the terminal device sends the SRS. For example, there is currently no clear solution yet for how a terminal device sends an SRS to ensure transmission of the SRS or ensure transmission fairness. For another example, a transmission resource of an SRS may conflict (or collide) with a transmission resource of another signal or channel (for example, an uplink signal or channel, or a downlink signal or channel). For example, the SRS conflicts with one or more of a physical uplink shared channel (physical uplink shared channel, PUSCH), a physical uplink control channel (physical uplink control channel, PUCCH), a physical downlink shared channel (physical downlink shared channel, PDSCH), a physical downlink control channel (physical downlink control channel, PDCCH), or a synchronization signal block (synchronization signal block, SSB). In this scenario, there is currently no clear solution yet for how to send an SRS to maintain transmission fairness of a signal or channel.

Figure 2:
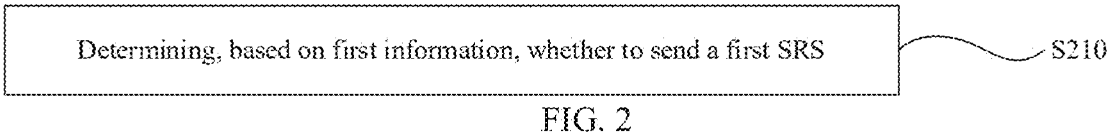
FIG. 2 is a schematic flowchart of a wireless communication method according to an embodiment of the present application.

FIG. 2 is a schematic flowchart of a wireless communication method according to an embodiment of the present application. The wireless communication method in FIG. 2 is performed by a terminal device. The terminal device may be the terminal device 110 in FIG. 1. The wireless communication method in FIG. 2 includes Step S210.

In Step S210, the terminal device determines, based on first information, whether to send a first SRS. The terminal device may be a reduced capability (RedCap) terminal device, or the terminal device may be a non-reduced-capability terminal device (namely, a common terminal device).

The first SRS may be used to position the terminal device. An SRS-based positioning method has been described above in detail. Details are not described herein again.

A sending manner of the first SRS may be a periodic sending manner or an aperiodic sending manner, which is not specifically limited in embodiments of the present application.

The first information may include one or more of the following: a first time window, a resource configuration of the first SRS, or a resource configuration of a first signal or channel. The resource configuration of the first SRS is used to configure a transmission resource of the first SRS. The resource configuration of the first signal or channel is used to configure a transmission resource of the first signal or channel. The foregoing transmission resource may include a time domain resource and/or a frequency domain resource.

The resource configuration of the first SRS may be sent by a network device to the terminal device. The resource configuration of the first signal or channel may be sent by the network device to the terminal device.

The first signal or channel may be an uplink signal or channel; or the first signal or channel may be a downlink signal or channel; or the first signal or channel may include both an uplink signal or channel and a downlink signal or channel. The uplink signal or channel may include one or both of a PUSCH or a PUCCH. The downlink signal or channel may include one or more of a PDSCH, a PDCCH, or an SSB.

The first time window may be a periodic time window or an aperiodic time window.

The first time window may be defined based on one or more of the following information: a start instant, an end instant, a period, or duration. For example, the first time window may be determined based on the start instant and the end instant. For another example, the first time window may be determined based on the start instant and the duration. For still another example, the first time window may be determined based on the end instant and the duration. For yet another example, if the first time window is a periodic time window, all time windows may be determined based on a position of one time window and a period.

In some implementations, the first time window may be a time window predefined in a protocol; or the first time window may be a time window configured by the network device. The following describes in detail a manner in which the network device configures the first time window.

A sending manner of the first SRS may be a frequency hopping sending manner. The first SRS may be an SRS sent in one hop of a frequency hopping process, or may be all SRSs transmitted in one frequency hopping cycle. A specific frequency hopping method is described above. Details are not described herein again. By using the frequency hopping manner, different frequencies are used to send the first SRS, which increases a bandwidth used for sending the SRS, thereby being beneficial to improve positioning precision.

By introducing the first time window to determine whether to send the first SRS, a clear solution is provided for sending of the first SRS, which is beneficial to maintain fairness in signal or channel transmission.

In some implementations, the transmission resource of the first SRS may be configured by the network device for the terminal device. For a frequency hopping sending manner, the network device may configure an SRS resource set for the terminal device, that is, the transmission resource of the SRS includes an SRS resource set. The SRS resource set may include resources used by the terminal device for sending the SRS on a plurality of frequencies. In some implementations, the network device may configure the SRS resource set for the terminal device by using DCI.

In some implementations, the terminal device executes a second operation if a first condition is met. The first condition is related to one or more of the first time window, the transmission resource of the first SRS, or the transmission resource of the first signal or channel. For example, the first condition may include: the transmission resource of the first SRS partially overlapping with the first time window. For another example, the first condition may include: the transmission resource of the first signal or channel partially overlapping with the first time window. For still another example, the first condition may include: the transmission resource of the first SRS conflicting with the transmission resource of the first signal or channel. For yet another example, the first condition may include: time at which the transmission resource of the first SRS conflicts with the transmission resource of the first signal or channel partially overlapping with the first time window. The foregoing first conditions may be used separately, or may be used in combination. For example, the first condition may include: the transmission resource of the first SRS partially overlapping with the first time window, and the transmission resource of the first SRS conflicting with the transmission resource of the first signal or channel. For another example, the first condition may include: the transmission resource of the first signal or channel partially overlapping with the first time window, and the transmission resource of the first SRS conflicting with the transmission resource of the first signal or channel. For ease of description, the time at which the transmission resource of the first SRS conflicts with the transmission resource of the first signal or channel is hereinafter referred to as first conflict time.

In some implementations, if the transmission resource of the first SRS conflicts with the transmission resource of the first signal or channel, the terminal device may determine, based on the first time window, whether to send the first SRS. The foregoing transmission resource may include a frequency domain resource and/or a time domain resource.

In some embodiments, the transmission resource of the first SRS conflicting with the transmission resource of the first signal or channel may mean that the transmission resource of the first SRS overlaps with the transmission resource of the first signal or channel.

In some implementations, if the terminal device is required to perform bandwidth part (bandwidth part, BWP) switching in a hopping process, the transmission resource (for example, a transmission time) of the first SRS is required to include a BWP switching time.

In some embodiments, the transmission resource of the first SRS overlapping with that of the first signal or channel may include: the transmission resource of the first SRS completely overlapping with the transmission resource of the first signal or channel; or the transmission resource of the first SRS including the transmission resource of the first signal or channel; or the transmission resource of the first signal or channel including the transmission resource of the first SRS; or the transmission resource of the first SRS partially overlapping with the transmission resource of the first signal or channel. FIG. 3A to FIG. 3D show several scenarios in which the transmission resource of the first SRS conflicts with the transmission resource of the first signal or channel. These scenarios are described below separately.

It should be noted that FIG. 3A to FIG. 3D are described by using an example in which the first SRS and the first signal or channel are transmitted on a same frequency domain resource, where time for sending the first SRS is t1-t2, and time for transmitting the first signal or channel is t3-t4.

Figure 3A:
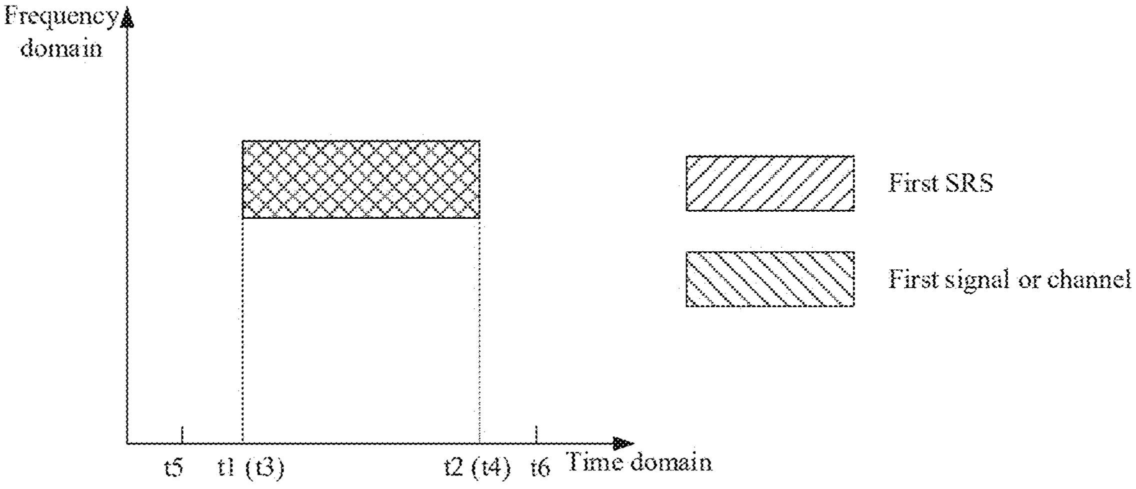
FIG. 3A is a diagram of a first example in which a transmission resource of a first SRS conflicts with that of a first signal or channel.

As shown in FIG. 3A, the transmission resource of the first SRS completely overlaps with the transmission resource of the first signal or channel, and time at which a conflict occurs is t1-t2 (or t3-t4).

Figure 3B:
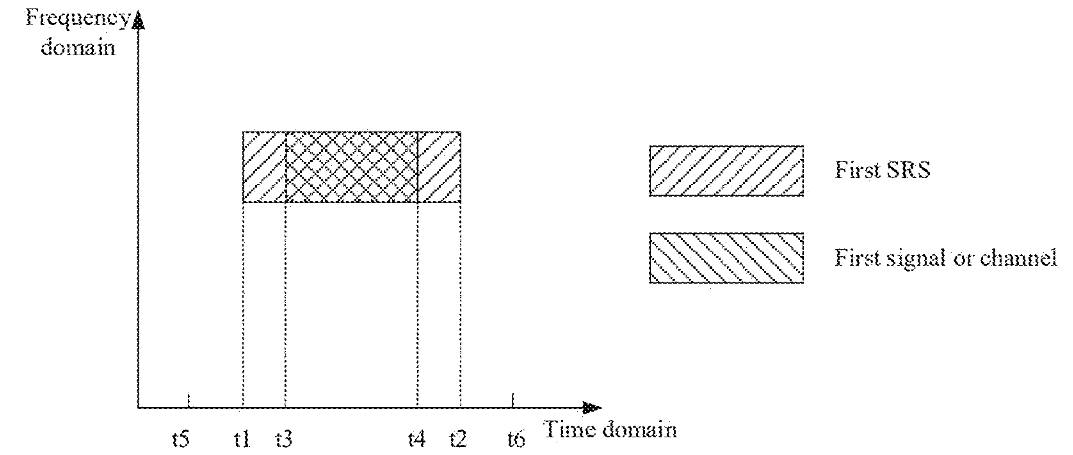
FIG. 3B is a diagram of a second example in which a transmission resource of a first SRS conflicts with that of a first signal or channel.

As shown in FIG. 3B, time for transmitting the first signal or channel is t3-t4; time for sending the first SRS is t1-t2, where t1-t2 includes t3-t4; and time at which the first SRS conflicts with the first signal or channel is t3-t4.

Figure 3C:
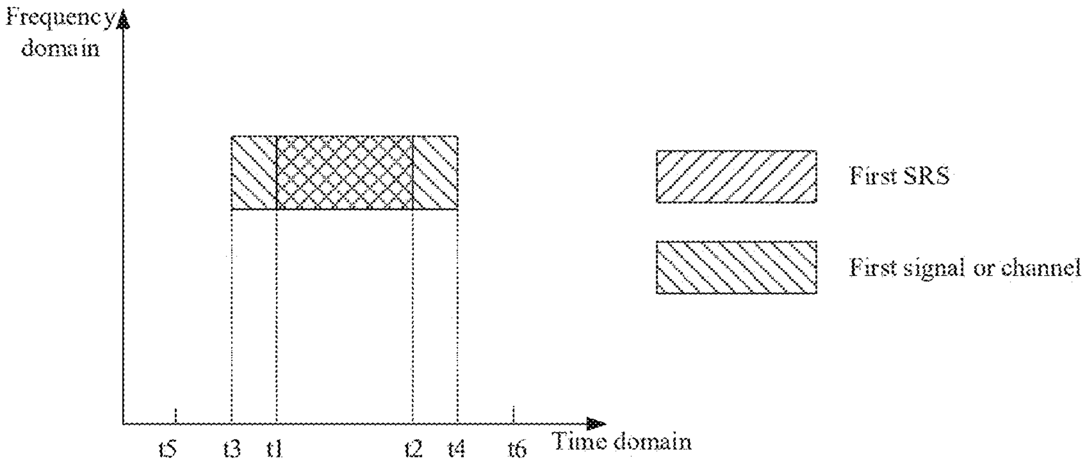
FIG. 3C is a diagram of a third example in which a transmission resource of a first SRS conflicts with that of a first signal or channel.

As shown in FIG. 3C, time for sending the first SRS is t1-t2, and time for transmitting the first signal or channel is t3-t4, where t3-t4 includes t1-t2; and time at which the first SRS conflicts with the first signal or channel is t1-t2.

Figure 3D:
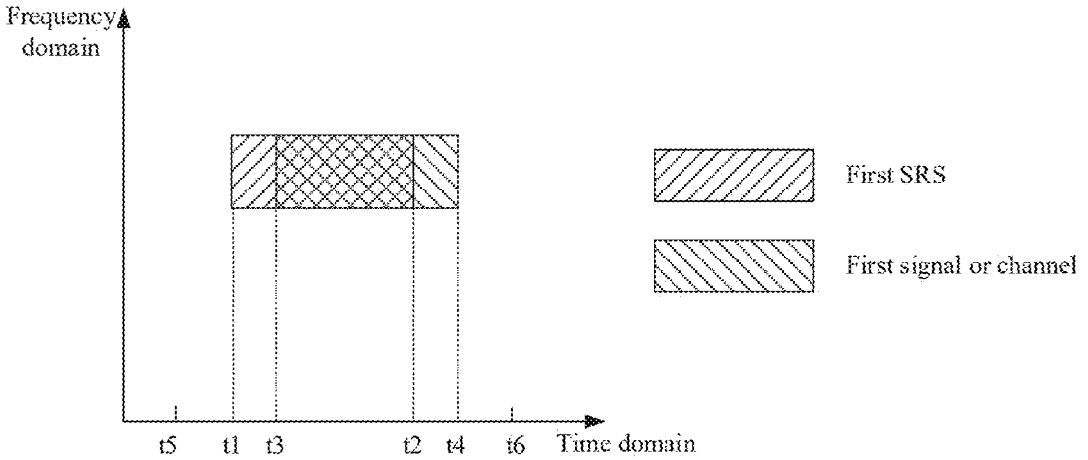
FIG. 3D is a diagram of a fourth example in which a transmission resource of a first SRS conflicts with that of a first signal or channel.

As shown in FIG. 3D, t1-t2 partially overlaps with t3-t4; and time at which the first SRS conflicts with the first signal or channel is t3-t2.

As described above, the first SRS may be sent in a frequency hopping manner. Therefore, the transmission resource of the first SRS may include a transmission resource used when the first SRS is transmitted at one frequency hop or a plurality of frequency hops.

The second operation may include one or more of the following: abstaining from sending of the first SRS; sending the first SRS; or skipping transmitting the first signal or channel. The first condition and the second operation are described in detail below.

In some implementations, the terminal device may determine, based on a status of an overlap between the transmission resource of the first SRS and the first time window, whether to send the first SRS. In an example, if the transmission resource of the first SRS is within the first time window, the terminal device may send the first SRS, without transmitting the first signal or channel. In this way, transmission of an SRS in the first time window can be ensured. In another example, if the transmission resource of the first SRS partially overlaps with the first time window, the terminal device may abstain from sending of the first SRS, or the terminal device may send the first SRS. For example, if the transmission resource of the first SRS partially overlaps with the first time window, and the transmission resource of the first SRS conflicts with the transmission resource of the first signal or channel, the terminal device may send the first SRS, without transmitting the first signal or channel. For another example, if the transmission resource of the first SRS partially overlaps with the first time window, and the transmission resource of the first SRS conflicts with the transmission resource of the first signal or channel, the terminal device may skip sending the first SRS but transmit the first signal or channel. In still another example, if the transmission resource of the first SRS is outside the first time window, the terminal device may skip transmitting the first SRS. For example, if the transmission resource of the first SRS is outside the first time window, and the transmission resource of the first SRS conflicts with the transmission resource of the first signal or channel, the terminal device may skip sending the first SRS but transmit the first signal or channel.

In some implementations, the terminal device may determine, based on a status of an overlap between the transmission resource of the first signal or channel and the first time window, whether to send the first SRS. In an example, if the transmission resource of the first signal or channel is within the first time window, the terminal device may skip transmitting the first signal or channel (or send the first SRS). In another example, if the transmission resource of the first signal or channel partially overlaps with the first time window, the terminal device may abstain from sending of the first SRS, or the terminal device may send the first SRS, without transmitting the first signal or channel. For example, if the transmission resource of the first signal or channel partially overlaps with the first time window, and the transmission resource of the first SRS conflicts with the transmission resource of the first signal or channel, the terminal device may send the first SRS, without transmitting the first signal or channel. For another example, if the transmission resource of the first signal or channel partially overlaps with the first time window, and the transmission resource of the first SRS conflicts with the transmission resource of the first signal or channel, the terminal device may skip sending the first SRS but transmit the first signal or channel. In still another example, if the transmission resource of the first signal or channel is outside the first time window, the terminal device may transmit the first signal or channel, so that transmission of a signal or channel outside the first time window can be ensured. For example, if the transmission resource of the first signal or channel is outside the first time window, and the transmission resource of the first SRS conflicts with the transmission resource of the first signal or channel, the terminal device may skip sending the first SRS but transmit the first signal or channel.

In some implementations, if time at which the transmission resource of the first SRS conflicts with the transmission resource of the first signal or channel partially overlaps with the first time window, the terminal device may abstain from sending of the first SRS, or the terminal device may send the first SRS, without transmitting the first signal or channel, which is described below in detail.

The above-described first condition is related to a partial overlap between resources. The partial overlap herein may just indicate that the resources partially overlap with each other, or may indicate that an overlap proportion between the resources is greater than or equal to a preset proportion. In other words, the terminal device may execute a second operation when the overlap proportion of the resource is relatively large. The preset proportion may be predefined in a protocol, or the preset proportion may be configured by the network device for the terminal device. The preset proportion may be ½. Certainly, the preset proportion may alternatively be another proportion, for example, ⅓ or ¼, which is not specifically limited in embodiments of the present application.

The overlap proportion may include one or more of the following: a proportion of an overlapped resource in the transmission resource of the first SRS; a proportion of an overlapped resource in the transmission resource of the first signal or channel; or a proportion of an overlapped resource in the first time window. For example, the first condition may include: a proportion, in the transmission resource of the first SRS, of an overlapped resource between the transmission resource of the first SRS and the first time window being greater than or equal to the preset proportion. For another example, the first condition may include: a proportion, in the first time window, of an overlapped resource between the transmission resource of the first SRS and the first time window being greater than or equal to the preset proportion. For still another example, the first condition may include: a proportion, in the transmission resource of the first signal or channel, of an overlapped resource between the transmission resource of the first signal or channel and the first time window being greater than or equal to the preset proportion. For yet another example, the first condition may include: a proportion, in the first time window, of an overlapped resource between the transmission resource of the first signal or channel and the first time window being greater than or equal to the preset proportion. For still yet another example, the first condition may include: a proportion, in the transmission resource of the first SRS, of an overlapped resource between the first conflict time and the first time window being greater than or equal to the preset proportion. For a further example, the first condition may include: a proportion, in the transmission resource of the first signal or channel, of an overlapped resource between the first conflict time and the first time window being greater than or equal to the preset proportion. For a still further example, the first condition may include: a proportion, in the first time window, of an overlapped resource between the first conflict time and the first time window being greater than or equal to the preset proportion.

In some implementations, the terminal device may determine, based on the first time window and a time domain location of a resource at which a conflict happens, whether to send the first SRS. For ease of description, the time domain location of the resource at which the conflict happens is hereinafter referred to as a first time domain location.

The terminal device may determine, based on a location relationship between the first time domain location and the first time window, whether to send the first SRS. The location relationship between the first time domain location and the first time window may include one or more of the following: the first time domain location is within the first time window; the first time domain location is outside the first time window; or the first time domain location partially overlaps with the first time window.

For different location relationships between the first time domain location and the first time window, the terminal device may use different policies for sending the first SRS. The following describes in detail the policy for the terminal device to send the first SRS.

In some embodiments, the terminal device executes a first operation if time at which the transmission resource of the first SRS conflicts with the transmission resource of the first signal or channel is within the first time window, where the first operation includes: sending the first SRS, without transmitting the first signal or channel. In other words, if the first time domain location is within the first time window, the terminal device may send the first SRS, without transmitting the first signal or channel, so that sending of the first SRS can be ensured.

Reference is made to FIG. 3A-3D again, which shows a case in which the first time domain location is within the first time window. The first time domain location may completely overlap with the first time window; or a length of the first time domain location is less than a length of the first time window, and the first time domain location is within the first time window.

As shown in FIG. 3A, the first time window is t5-t6, and the first time domain location is t1-t2, where t1-t2 is within t5-t6.

As shown in FIG. 3B, the first time window is t5-t6, and the first time domain location is t3-t4, where t3-t4 is within t5-t6.

As shown in FIG. 3C, the first time window is t5-t6, and the first time domain location is t1-t2, where t1-t2 is within t5-t6.

As shown in FIG. 3D, the first time window is t5-t6, and the first time domain location is t3-t2, where t3-t2 is within t5-t6.

In some embodiments, the terminal device may execute a third operation if time at which the transmission resource of the first SRS conflicts with the transmission resource of the first signal or channel partially overlaps with the first time window, where the third operation includes: skipping sending the first SRS; or sending the first SRS, without transmitting the first signal or channel. In other words, the terminal device may execute the third operation if the first time domain location partially overlaps with the first time window.

If the first time domain location partially overlaps with the first time window, the terminal device may send the first SRS, without transmitting the first signal or channel, or the terminal device may skip sending the first SRS but transmit the first signal or channel. A policy to be specifically used may be determined by the terminal device itself, or may be indicated by the network device to the terminal device.

If the terminal device sends the first SRS without transmitting the first signal or channel, sending of the first SRS can be ensured, thereby improving positioning performance. If the terminal device transmits the first signal or channel without sending the first SRS, transmission of the first signal or channel can be ensured.

In some embodiments, outside the first time window, sending of the first SRS is associated with whether transmission of the first uplink signal or channel is within an activated BWP. For example, if the first time domain location is outside the first time window, the terminal device may determine, based on whether transmission of the first uplink signal or channel is within the activated BWP, whether to send the first SRS.

In some embodiments, the terminal device may execute the third operation if time at which the transmission resource of the first SRS conflicts with a transmission resource of the first uplink signal or channel is outside the first time window (or the first time domain location is outside the first time window). The third operation includes one of the following: if transmission of the first uplink signal or channel is outside the activated BWP, sending the first SRS, without sending the first uplink signal or channel; or if transmission of the first uplink signal or channel is within the activated BWP, sending the first uplink signal or channel, without sending the first SRS.

If transmission of the first uplink signal or channel is outside the activated BWP, it indicates that transmission of the first uplink signal or channel is within a non-activated BWP, and when transmitting the first uplink signal or channel, the terminal device is required to activate the BWP before transmitting the first uplink signal or channel. In some scenarios, the terminal device may not have enough time to prepare the first uplink signal or channel. Therefore, the terminal device may abstain from transmission of the first uplink signal or channel, but ensure sending of the first SRS.

For example, the first uplink signal or channel may be scheduled or triggered based on DCI. The DCI may appear before or after the terminal device starts using a frequency hop to send the first SRS. If the DCI arrives relatively late, and transmission of the first uplink signal or channel is outside the activated BWP (a UL BWP), the terminal device may not have enough time to prepare the first uplink signal or channel. In this case, the terminal device may abstain from transmission of the first uplink signal or channel but ensure sending of the first SRS.

If transmission of the first uplink signal or channel is within the activated BWP, the terminal device may have enough time to prepare the first uplink signal or channel. In this case, the terminal device may first ensure transmission of the first uplink signal or channel but abstain from transmission of the first SRS.

In some embodiments, the first signal or channel may be an SSB. If time at which the transmission resource of the first SRS conflicts with the transmission resource of the SSB is outside the first time window, the terminal device may preferentially ensure transmission of the SSB, but abstain from sending of the first SRS. By ensuring transmission of the SSB, synchronization between the terminal device and the network device may be ensured, which is beneficial to improve communication performance.

In some embodiments, the terminal device skipping sending the first SRS may be replaced with the terminal device abstaining from sending of the first SRS, or the terminal device discarding the first SRS.

In some embodiments, as described above, a sending manner of the first SRS may be a frequency hopping sending manner, and a frequency hopping process may involve BWP switching. After a hop is completed, the terminal device may stay on a switched-to BWP, or may be switched back to the activated BWP. In some implementations, if a time interval between times at which the first SRS is sent for two consecutive times is greater than a first switching time, the terminal device may switch back to the activated BWP after a hop is completed, where the first switching time may be time required for switching to and switching from the activated BWP. The activated BWP may be a BWP used for transmitting the first signal or channel. By switching back to the activated BWP, transmission of the first signal or channel (or another signal or channel) may be ensured.

In some implementations, whether the terminal device is required to switch back to the activated BWP may be determined by the terminal device itself, or may be indicated by the network device to the terminal device. For a case in which whether the terminal device is required to switch back to the activated BWP is indicated by the network device to the terminal device, if the first switching time is related to a hardware level of the terminal device, the network device may not know the first switching time of the terminal device, and the terminal device may report the first switching time to the network device. In some embodiments, the network device may send a request message to the terminal device, so as to request the first switching time. After receiving the request message, the terminal device may send the first switching time to the network device.

In some implementations, if the terminal device does not have any service with a relatively high requirement on latency, that is, if the first signal or channel has a low requirement on latency, the terminal device may not switch back to the activated BWP between two frequency hops. If the terminal device cannot determine latency required by a service (or the first signal or channel), the network device may send indication information to the terminal device, so as to indicate whether the terminal device is required to switch back to the activated BWP between two frequency hops.

The time interval between the times at which the first SRS is sent for two consecutive times may be understood as time of one hopping process. One hopping process may be a process of hopping from a first frequency to a second frequency when the first SRS is sent by means of frequency hopping. The time interval between the times at which the first SRS is sent for two consecutive times may be configured by the network device for the terminal device, or may be predefined in a protocol. Assuming that the first frequency and the second frequency are two adjacent frequencies in a frequency hopping process, the time interval between the times at which the first SRS is sent for two consecutive times may be an absolute value of a difference between time at which the terminal device sends the first SRS on the first frequency and time at which the terminal device sends the first SRS on the second frequency.

The first switching time is time required for the terminal device to switch from the activated BWP to another non-activated BWP and then switch to the activated BWP.

When the time interval between the times at which the first SRS is sent for two consecutive times is greater than the first switching time, it indicates that the terminal device may have enough time to switch back to the activated BWP, and perform transmission of the first signal or channel (or another signal or channel). For example, the terminal device may switch from the first BWP to the second BWP and send the first SRS on the second BWP, and subsequently switch back to the first BWP and send the uplink signal or channel on the first BWP.

In some embodiments, the first time window may overlap with a measurement gap. In this case, the terminal device may execute a fourth operation, where the fourth operation includes: sending the first SRS, without performing downlink measurement; or performing downlink measurement, without sending the first SRS.

The terminal device sending the first SRS without performing downlink measurement may be understood as the first time window being valid but the measurement gap being invalid. The terminal device performing downlink measurement without sending the first SRS may be understood as the first time window being invalid but the measurement gap being valid.

In the measurement gap, the terminal device may measure a reference signal sent by a serving cell and/or a neighboring cell, so as to determine the signal quality of the serving cell and/or neighboring cell. If the terminal device does not perform downlink measurement, it indicates that the terminal device may not measure the reference signal sent by the serving cell and/or neighboring cell.

If the first time window overlaps with the measurement gap, the terminal device may send the first SRS without performing downlink measurement, or the terminal device may perform downlink measurement without sending the first SRS. An operation to be specifically executed by the terminal device may be selected by the terminal device itself, or may be indicated by the network device to the terminal device.

In some embodiments, if the terminal device sends the first SRS, the first SRS may be measured by the serving cell and/or neighboring cell of the terminal device. For example, the serving cell may measure the first SRS sent by the terminal device, and/or the neighboring cell may measure the first SRS sent by the terminal device.

In some embodiments, the neighboring cell may have two execution policies. One of the policies is measuring the first SRS sent by the terminal device, and the other one is skipping measuring the first SRS sent by the terminal device. In some implementations, the neighboring cell may skip, by default, measuring the first SRS sent by the terminal device. If the neighboring cell is required to measure the first SRS, the serving cell or a positioning server may indicate the first time window to the neighboring cell. The neighboring cell may measure the first SRS after receiving the indication information used for indicating the first time window.

The first time window overlapping with the measurement gap may indicate that the first time window partially overlaps with the measurement gap, or that the first time window includes the measurement gap, or that the measurement gap includes the first time window.

It can be learned from the above that a policy for sending the first SRS inside the first time window and outside the second time window is studied in embodiments of the present application, which not only ensures transmission of the SRS, but also ensures transmission of another signal or channel, thereby being beneficial to ensure transmission fairness of the signal or channel.

The following describes the first time window in detail.

In some embodiments, the first time window may be one time period, or the first time window may include a plurality of time periods.

In some embodiments, the first time window may be a periodic time window or an aperiodic time window.

Figure 4:
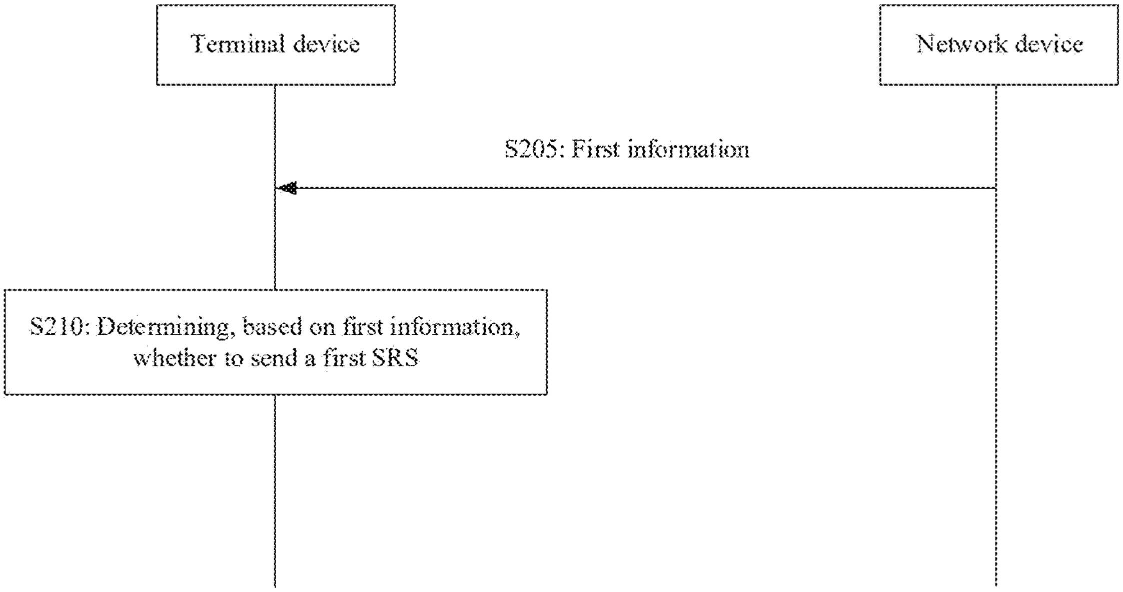
FIG. 4 is a schematic flowchart of a wireless communication method according to another embodiment of the present application.

In some embodiments, the first time window may be predefined in a protocol, or the first time window may be indicated by the network device to the terminal device. For example, the network device may send second information to the terminal device, where the second information is used to indicate the first time window (see Step S205 in FIG. 4).

A carrying manner of the second information is not specifically limited in embodiments of the present application. In an example, the second information may be carried in one or more of the following: radio resource control (radio resource control, RRC) signalling, higher layer signalling, or downlink control information (downlink control information, DCI). For example, the second information may be carried in the RRC signalling, and the network device may indicate the first time window to the terminal device by using the RRC signalling. For another example, the second information may be carried in the higher layer signalling, and the network device may indicate the first time window to the terminal device by using the higher layer signalling. For still another example, the second information may be carried in the DCI, and the network device may indicate the first time window to the terminal device by using the DCI.

The foregoing higher layer signalling may include RRC signalling and/or an MAC control element (MAC control element, MAC CE).

In some implementations, the first time window may be represented by one or more of a start instant, an end instant, or duration.

In some implementations, the network device may indicate the duration of the first time window by higher layer signalling, and indicate the start instant and/or end instant of the first time window by DCI. By flexibly indicating the start instant and/or end instant of the first time window based on the DCI, a probability of triggering transmission of the SRS based on the DCI may be increased.

In some implementations, the terminal device may use the periodic first time window to send an aperiodic SRS, and a resource set used for transmitting the SRS may be scheduled based on the DCI. In this case, a transmission time of the SRS may not overlap with the first time window completely.

In some implementations, the second information may be used to indicate the transmission resource of the first SRS. In other words, the second information may be used to indicate a transmission resource set of the first SRS. The first time window may be determined based on the transmission resource of the first SRS. In other words, the terminal device may determine the first time window based on the transmission resource of the first SRS. For example, the terminal device may determine the start instant of the first time window based on a transmission resource of an SRS with the earliest time domain in the transmission resource of the first SRS. The terminal device may determine the end instant of the first time window based on the duration of the first time window, where the duration of the first time window may be configured by the network device for the terminal device; or the terminal device may determine the end instant of the first time window based on a transmission resource of an SRS with the newest (or latest) time domain in the transmission resource of the SRS. In this manner, a transmission success rate of an aperiodic SRS may be improved.

In some implementations, the second information may be a bitmap, and the bitmap may be used to indicate the first time window. For example, the network device may configure the first time window for the terminal device according to a specific pattern, by the higher layer signalling.

It should be noted that the start instant of the first time window may also be referred to as a start location of the first time window, and that the end instant of the first time window may also be referred to as an end location of the first time window.

As described above, for a positioning system, a frequency hopping technology may increase a receiving or sending bandwidth of the system under a limited hardware processing capacity, and can improve anti-interference performance and utilize a small frequency more efficiently, thereby improving system capacity. The following issues may further be considered when SRS-based positioning is performed by using the frequency hopping technology.

Frequency selection and planning: frequencies for frequency hopping is required to be selected and planned effectively, so as to avoid a conflict with another system or an interference source. Improper frequency selection may result in degraded signal quality and reduced communication performance. During positioning processing, a signal sent by a user may be received by a plurality of base stations/transmitting and receiving points, or a user receives signals sent by a plurality of base stations/transmitting and receiving points, which requires planning the transmission of signals among the plurality of base stations/transmitting and receiving points. In addition, a time dimension is also required to be considered during frequency planning.

Synchronization problem: Devices in a frequency hopping system are required to keep synchronized, so as to ensure that they jump to the same frequency at the same time. A synchronization problem may result in a communication failure between the devices, which affects performance of the system.

Latency: Frequency hopping introduces generation and synchronization of frequency hopping sequences, which may increase communication latency. For real-time application such as a voice call or a video stream, latency may be a key problem.

Power consumption: A frequency hopping system may require a more complex circuit and algorithm to support frequency hopping, which may result in higher power consumption of a device. This may be a key problem for a battery-powered mobile device.

Device complexity: A frequency hopping system is more complex than a system with a fixed frequency, which may increase difficulty in design, maintenance, and troubleshooting.

Design of a frequency selection algorithm: Designing an effective frequency selection algorithm is crucial to performance of a frequency hopping system. An inappropriate algorithm may lead to insufficient frequency selection or frequent switching, which affects communication quality.

Security: A frequency hopping technology is usually used to improve communication security. However, if an encryption algorithm is not strong enough or is implemented improperly, a security threat may be caused.

The foregoing describes method embodiments of the present application in detail with reference to FIG. 1 to FIG. 4. The following describes apparatus embodiments of the present application in detail with reference to FIG. 5 to FIG. 7. It should be understood that the description of the method embodiments corresponds to the description of the apparatus embodiments. Therefore, for parts that are not described in detail, reference may be made to the foregoing method embodiments.

Figure 5:
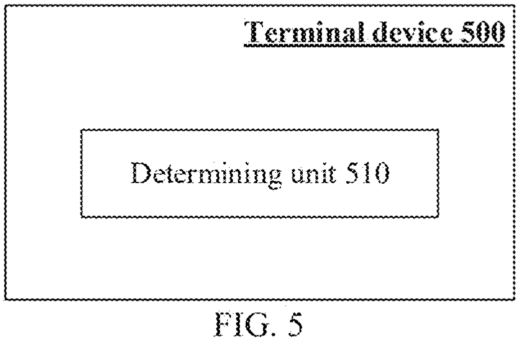
FIG. 5 is a schematic block diagram of a terminal device according to an embodiment of the present application.

FIG. 5 is a schematic block diagram of a terminal device according to an embodiment of the present application. The terminal device may be any one of the terminal devices described above. The terminal device includes:

a determining unit 510, determining, based on first information, whether to send a first sounding reference signal SRS, where the first SRS is used to position the terminal device, and the first information includes one or more of the following: a first time window, a resource configuration of the first SRS, or a resource configuration of a first signal or channel.

In some implementations, the terminal device further includes an execution unit. The execution unit is configured to execute a first operation if time at which a transmission resource of the first SRS conflicts with a transmission resource of the first signal or channel is within the first time window, where the first operation includes: sending the first SRS, without transmitting the first signal or channel.

In some implementations, the terminal device executes a second operation if a first condition is met, where the first condition includes one or more of the following: a transmission resource of the first SRS partially overlapping with the first time window; a transmission resource of the first signal or channel partially overlapping with the first time window; or time at which a transmission resource of the first SRS conflicts with a transmission resource of the first signal or channel partially overlapping with the first time window; and the second operation includes one of the following: abstaining from sending of the first SRS; sending the first SRS; or skipping transmitting the first signal or channel.

In some implementations, the partially overlapping includes an overlap proportion between resources is greater than or equal to a preset proportion.

In some implementations, the overlap proportion includes one or more of the following: a proportion of an overlapped resource in the transmission resource of the first SRS; a proportion of an overlapped resource in the transmission resource of the first signal or channel; or a proportion of an overlapped resource in the first time window.

In some implementations, the preset proportion is ½.

In some implementations, the preset proportion is predefined in a protocol.

In some implementations, the execution unit is further configured to execute a third operation if time at which a transmission resource of the first SRS conflicts with a transmission resource of the first signal or channel partially overlaps with the first time window, where the third operation includes one of the following: abstaining from sending of the first SRS; or sending the first SRS, without transmitting the first signal or channel.

In some implementations, outside the first time window, sending of the first SRS is associated with whether transmission of the first uplink signal or channel is within an activated BWP.

In some implementations, the terminal device executes a third operation if time at which a transmission resource of the first SRS conflicts with a transmission resource of the first uplink signal or channel is outside the first time window, where the third operation includes one of the following: if transmission of the first uplink signal or channel is outside the activated bandwidth part BWP, sending the first SRS, without sending the first uplink signal or channel; or if transmission of the first uplink signal or channel is within the activated BWP, sending the first uplink signal or channel, without sending the first SRS.

In some implementations, the execution unit is further configured to: if time at which a transmission resource of the first SRS conflicts with a transmission resource of a synchronization signal block SSB is outside the first time window, skip sending the first SRS.

In some implementations, a sending manner of the first SRS is a frequency hopping sending manner; and the execution unit is further configured to: if a time interval between times at which the first SRS is sent for two consecutive times is greater than a first switching time, switch back to an activated BWP after a hop is completed, where the first switching time is time required for switching to and switching from the activated BWP.

In some implementations, the execution unit is further configured to execute a fourth operation if the first time window overlaps with a measurement gap, where the fourth operation includes one of the following: sending the first SRS, without performing downlink measurement; or performing downlink measurement, without sending the first SRS.

In some implementations, the first SRS is measured by a serving cell and/or a neighboring cell of the terminal device.

In some implementations, the first time window is a periodic time window or an aperiodic time window.

In some implementations, the terminal device further includes: a receiving unit, receiving second information sent by a network device, where the second information is used to indicate the first time window.

In some implementations, the second information is carried in one or more of the following: radio resource control RRC signalling; higher layer signalling; or downlink control information DCI.

In some implementations, the second information meets one or both of the following: the second information is used to indicate a transmission resource of the first SRS, and the first time window is determined based on the transmission resource of the first SRS; or the second information is a bitmap, and the bitmap is used to indicate the first time window.

In some implementations, the second information is used to indicate one or more of a start instant, duration, or an end instant of the first time window.

In some implementations, a sending manner of the first SRS is a frequency hopping sending manner.

In some implementations, the terminal device is a reduced-capability terminal device.

Figure 6:
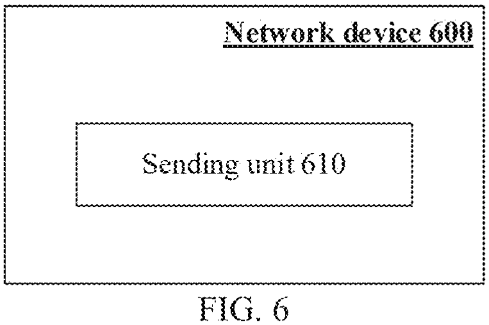
FIG. 6 is a schematic block diagram of a network device according to an embodiment of the present application.

FIG. 6 is a schematic block diagram of a network device according to an embodiment of the present application. The network device may be any one of the network devices described above. The network device in FIG. 6 includes:

a sending unit 610, sending second information to a terminal device, where the second information is used to indicate a first time window, and the first time window is used by the terminal device to determine whether to send a first SRS.

In some implementations, the first time window is a periodic time window or an aperiodic time window.

In some implementations, the second information is carried in one or more of the following: RRC signalling; higher layer signalling; or DCI.

In some implementations, the second information meets one or both of the following: the second information is used to indicate a transmission resource of the first SRS, and the first time window is determined based on the transmission resource of the first SRS; or the second information is a bitmap, and the bitmap is used to indicate the first time window.

In some implementations, the second information is used to indicate one or more of a start instant, duration, or an end instant of the first time window.

In some implementations, a sending manner of the first SRS is a frequency hopping sending manner.

In some implementations, the terminal device is a reduced-capability terminal device.

Figure 7:
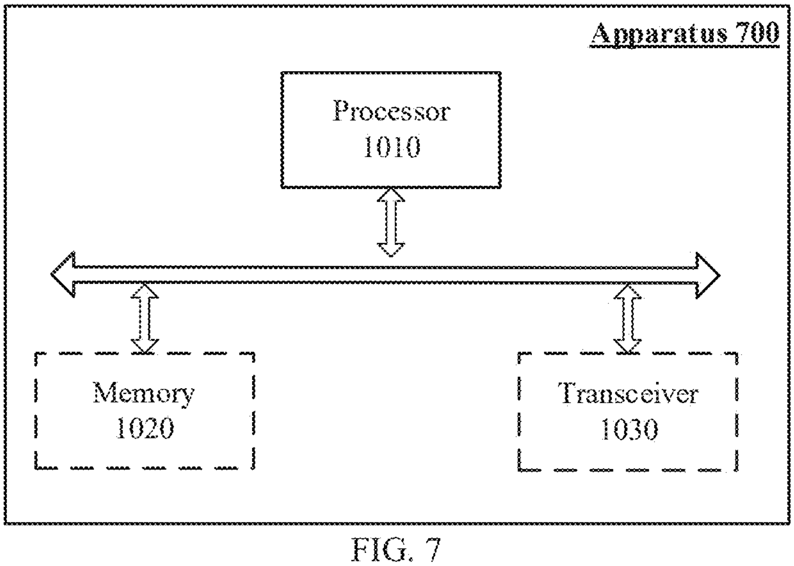
FIG. 7 is a schematic block diagram of a communications device according to an embodiment of the present application.

FIG. 7 is a schematic structural diagram of a communications apparatus according to an embodiment of the present application. Dashed lines in FIG. 7 indicate that the unit or module is optional. The apparatus 700 may be configured to implement a method described in the foregoing method embodiments. The apparatus 700 may be a chip or a communications device. The communications device may be any one of the communications devices described above. For example, the communications device may be a terminal device or a network device.

The apparatus 700 may include one or more processors 710. The processor 710 may support the apparatus 700 in implementing a method described in the foregoing method embodiments. The processor 710 may be a general-purpose processor or a dedicated processor. For example, the processor may be a central processing unit (central processing unit, CPU). Alternatively, the processor may be another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

The apparatus 700 may further include one or more memories 720. The memory 720 stores a program that may be executed by the processor 710 to cause the processor 710 to perform a method described in the foregoing method embodiments. The memory 720 may be independent of the processor 710 or may be integrated into the processor 710.

The apparatus 700 may further include a transceiver 730. The processor 710 may communicate with another device or chip through the transceiver 730. For example, the processor 710 may transmit data to and receive data from another device or chip through the transceiver 730.

An embodiment of the present application further provides a computer-readable storage medium for storing a program. The computer-readable storage medium may be applied to the communications device provided in embodiments of the present application, and the program causes a computer to perform the methods to be performed by the communications device in various embodiments of the present application.

An embodiment of the present application further provides a computer program product. The computer program product includes a program. The computer program product may be applied to the communications device provided in embodiments of the present application, and the program causes a computer to perform the methods to be performed by the communications device in various embodiments of the present application.

An embodiment of the present application further provides a computer program. The computer program may be applied to the communications device provided in embodiments of the present application, and the computer program causes a computer to perform the methods to be performed by the communications device in embodiments of the present application.

It should be understood that the terms “system” and “network” in the present application may be used interchangeably. In addition, the terms used in the present application are only used to explain the specific embodiments of the present application, and are not intended to limit the present application. The terms “first”, “second”, “third”, “fourth”, and the like in the specification, claims, and accompanying drawings of the present application are used to distinguish between different objects, rather than to describe a specific order. In addition, the terms “include” and “have” and any variations thereof are intended to cover a non-exclusive inclusion.

In embodiments of the present application, “indicate” mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In embodiments of the present application, "include" mentioned may refer to direct inclusion, or may refer to indirect inclusion. Optionally, the term "include" mentioned in embodiments of the present application may be replaced with "indicate" or "be used to determine". For example, A including B may be replaced with A indicating B, or A being used to determine B.

In embodiments of the present application, "B corresponding to A" means that B is associated with A, and B may be determined based on A. However, it should also be understood that determining B based on A does not mean determining B based only on A, but instead, B may be determined based on A and/or other information.

In embodiments of the present application, the term "correspond" may mean that there is a direct or indirect correspondence between the two, or may mean that there is an association relationship between the two, or may mean that there is a relationship such as indicating and being indicated, or configuring and being configured.

In embodiments of the present application, "predefined" or "pre-configured" may be implemented by pre-storing corresponding code, tables, or other forms that may be used to indicate related information in devices (for example, including a terminal device and a network device), and a specific implementation thereof is not limited in the present application. For example, being predefined may refer to being defined in a protocol.

In embodiments of the present application, the "protocol" may refer to a standard protocol in the communications field, and may include, for example, an LTE protocol, an NR protocol, and a related protocol applied to a future communications system, which is not limited in the present application.

In embodiments of the present application, the term "and/or" is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects.

In embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In several embodiments provided in the present application, it should be understood that the disclosed system, apparatus, and method may be implemented in other manners. For example, the described apparatus embodiments are merely examples. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Units described as separate components may be or may not be physically separate, and components displayed as units may be or may not be physical units, that is, may be located in one position, or distributed on a plurality of network units. Some or all of the units may be selected according to actual needs to achieve the objectives of solutions in embodiments.

In addition, functional units in embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, and a digital subscriber line (digital subscriber line, DSL)) manner or a wireless (for example, infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid state disk (solid state disk, SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wireless communication method, comprising:

determining, by a terminal device based on first information, whether to send a first sounding reference signal (SRS) for positioning the terminal device, and the first information comprises one or more of following: a first time window, a resource configuration of the first SRS, or a resource configuration of a first signal or channel, wherein a sending manner of the first SRS is a frequency hopping sending manner, and the method further comprises:

when a time interval between times at which the first SRS is sent for two consecutive times is greater than a first switching time, switching, by the terminal device, back to an activated bandwidth part (BWP) wherein the first switching time is time required for switching to and switching from the activated BWP.

2. The method according to claim 1, further comprising: executing, by the terminal device, a first operation when time at which a transmission resource of the first SRS conflicts with a transmission resource of the first signal or channel is within the first time window, wherein the first operation comprises:

sending the first SRS, without transmitting the first signal or channel.

3. The method according to claim 1, wherein the terminal device executes a second operation when a first condition is met, wherein the first condition comprises one or more of following:

a transmission resource of the first SRS partially overlapping with the first time window;

a transmission resource of the first signal or channel partially overlapping with the first time window; or time at which a transmission resource of the first SRS conflicts with a transmission resource of the first signal or channel partially overlapping with the first time window; and the second operation comprises one of following:

abstaining from sending of the first SRS;

sending the first SRS; or skipping transmitting the first signal or channel.

4. The method according to claim 3, wherein the partially overlapping comprises an overlap proportion between resources is greater than or equal to a preset proportion.

5. The method according to claim 4, wherein the overlap proportion comprises one or more of following:

a proportion of an overlapped resource in the transmission resource of the first SRS;

a proportion of an overlapped resource in the transmission resource of the first signal or channel; or a proportion of an overlapped resource in the first time window.

6. The method according to claim 4, wherein the preset proportion is ½.

7. The method according to claim 4, wherein the preset proportion is predefined in a protocol.

8. The method according to claim 1, wherein outside the first time window, sending of the first SRS is associated with whether transmission of a first uplink signal or channel is within the activated BWP.

9. The method according to claim 8, further comprising: executing, by the terminal device, a third operation when time at which a transmission resource of the first SRS conflicts with a transmission resource of the first uplink signal or channel is outside the first time window, wherein the third operation comprises one of following:

when transmission of the first uplink signal or channel is outside the activated BWP, sending the first SRS, without sending the first uplink signal or channel; or when transmission of the first uplink signal or channel is within the activated BWP, sending the first uplink signal or channel, without sending the first SRS.

10. The method according to claim 1, further comprising: when time at which a transmission resource of the first SRS conflicts with a transmission resource of a synchronization signal block SSB is outside the first time window, skipping, by the terminal device, sending the first SRS.

11. The method according to claim 1, further comprising: executing, by the terminal device, a fourth operation if the first time window overlaps with a measurement gap, wherein the fourth operation comprises one of following:

sending the first SRS, without performing downlink measurement; or performing downlink measurement, without sending the first SRS.

12. The method according to claim 11, wherein the first SRS is measured by at least one of a serving cell or a neighboring cell of the terminal device.

13. The method according to claim 1, wherein the first time window is a periodic time window or an aperiodic time window.

14. The method according to claim 1, further comprising: receiving, by the terminal device, second information from a network device, wherein the second information indicates the first time window.

15. The method according to claim 14, wherein the second information is carried in one or more of following:

radio resource control (RRC) signalling;

higher layer signalling; or downlink control information (DC).

16. The method according to claim 14, wherein the second information meets one or both of following:

the second information indicates a transmission resource of the first SRS, and the first time window is determined based on the transmission resource of the first SRS; or the second information is a bitmap, and the bitmap indicates the first time window.

17. The method according to claim 14, wherein the second information indicates one or more of a start instant, duration, or an end instant of the first time window.

18. A wireless communication method, comprising:

sending, by a network device, second information to a terminal device, wherein the second information indicates a first time window, and the first time window is associated with a first sounding reference signal (SRS), wherein a sending manner of the first SRS is a frequency hopping sending manner, and wherein when a time interval between times at which the first SRS is sent for two consecutive times is greater than a first switching time, the terminal device switches back to an activated bandwidth part (BWP) wherein the first switching time is time required for switching to and switching from the activated BWP.

19. An apparatus, comprising:

at least one processor; and one or more non-transitory computer-readable storage media coupled to the at least one processor and storing programming instructions for execution by the at least one processor, wherein the programming instructions, when executed, cause the apparatus to perform operations comprising:

determining, based on first information, whether to send a first sounding reference signal (SRS) for positioning a terminal device, and the first information comprises one or more of following: a first time window, a resource configuration of the first SRS, or a resource configuration of a first signal or channel, wherein a sending manner of the first SRS is a frequency hopping sending manner, and the operations further comprise:

when a time interval between times at which the first SRS is sent for two consecutive times is greater than a first switching time, back to an activated bandwidth part (BWP) wherein the first switching time is time required for switching to and switching from the activated BWP.

20. The apparatus according to claim 19, wherein the operations further comprise:

executing a first operation when time at which a transmission resource of the first SRS conflicts with a transmission resource of the first signal or channel is within the first time window, wherein the first operation comprises sending the first SRS, without transmitting the first signal or channel.

* * * * *